United States Patent [19]

Akkerman et al.

[11] 3,940,978

[45] Mar. 2, 1976

[54] MOTORCYCLE DYNAMOMETER

[76] Inventors: James William Akkerman, 1902 Mermaid Lane, Houston, Tex. 77058; Jon Derek Akkerman, 809 Mississippi, South Houston, Tex. 77587

[22] Filed: Sept. 13, 1974

[21] Appl. No.: 505,658

[52] U.S. Cl. ................................................. 73/117
[51] Int. Cl.[2] ........................................ G01L 5/13
[58] Field of Search ............ 73/117, 123, 126, 134

[56] References Cited
UNITED STATES PATENTS

| | | | |
|---|---|---|---|
| 1,373,585 | 4/1921 | Baker | 73/117 X |
| 2,287,084 | 6/1942 | Bennett | 73/117 |
| 3,180,138 | 4/1965 | Hundley | 73/117 |
| 3,273,384 | 9/1966 | Flaugher | 73/117 X |
| 3,733,894 | 5/1973 | Dahl | 73/117 |

FOREIGN PATENTS OR APPLICATIONS

| | | | |
|---|---|---|---|
| 1,307,123 | 9/1962 | France | 73/117 |
| 1,180,189 | 6/1959 | France | 73/117 |

*Primary Examiner*—Jerry W. Myracle
*Attorney, Agent, or Firm*—Torres & Berryhill

[57] ABSTRACT

Dynamometer apparatus for measuring the performance of a wheeled vehicle comprising: a support assembly on which the vehicle may be supported; power absorption apparatus mounted on the support assembly for engagement with at least one wheel of the vehicle; a pump connected to the power absorption apparatus for producing a fluid pressure in response to the torque produced by the vehicle wheel; speed measuring apparatus mounted on the support for engagement with the vehicle wheel to indicate the surface speed thereof; and indicator apparatus connected to the pump and the speed measuring apparatus for correlating fluid pressure and surface speed with the performance of the vehicle.

18 Claims, 4 Drawing Figures

MOTORCYCLE DYNAMOMETER

BACKGROUND OF THE INVENTION

1. Field of the Invention

The present invention pertains to dynamometers or dynamic testing apparatus for measuring the performance of a vehicle. In particular, the present invention concerns a dynamometer particularly suitable for measuring the power characteristics of a motorcycle.

2. Description of the Prior Art

Ever since the development of the engine and the motor, man has sought means to accurately measure the power characteristics thereof. Since the horsepower delivered by a rotating shaft is defined as $2\pi nT/33,000$, where $n$ equals rpm and T equals torque in footpounds, output horsepower can be determined by measuring the speed and the torque of the output shaft. The speed can be measured directly by means of a tachometer. Mechanical power measuring devices called dynamometers have been developed to measure the torque.

There are basically two types of dynamometers: (1) those absorbing the power and dissipating it as heat and (2) those transmitting the measured power. In the transmission dynamometer, the torque is measured by means of strain guage elements bonded to the transmission shaft. There are several kinds of absorption dynamometers, one of which is the Prony Brake which applies a friction load to the output shaft by means of wood blocks, flexible bands or other friction surfaces. The fan brake and water brake are other types of dynamometers which are known.

Many types of dynamometers have been specially developed for measuring the power characteristics of automobiles. Some recent examples of automobile dynamometers may be seen in U.S. Pat. Nos. 3,277,702; 3,491,587; and 3,651,690. Although some of the principles involved may be similar, dynamometers developed for automobiles are not necessarily desirable for use on motorcycles.

In the past, there has been little concern, other than by manufacturing companies, for measuring the power characteristics of motorcycles. However, with the greatly increased interest in and use of motorcycles, there is an increasing demand for devices which accurately measure the performance of these motorcycles. An example of a motorcycle dynamometer may be seen in recently issued U.S. Pat. No. 3,733,894. Other motorcycle dynamometers are commercially available.

Since cyclists are quite mobile and may be found in many different locations, it is desirable that motorcycle dynamometers be as portable as possible. It is also desirable that such dynamometers be self-sufficient, relying as little as possible on outside power sources and auxiliary apparatus such as plumbing for cooling water, etc.

Most of the commercially available motorcycle dynamometers leave a great deal to be desired in accuracy. The apparatus for measuring either one or both of the torque and speed of a motorcycle may not be totally reliable. Furthermore, most of the motorcycle dynamometers available do not provide the road wind normally encountered by a motorcycle under normal operating conditions. Those that do, do so inadequately or by means of a relatively small fan or blower which requires auxiliary power sources.

In addition, most motorcycle dynamometers of the prior art utilize some form of load or torque arm for measurement of torque. Such devices are relatively expensive and sometimes difficult to calibrate. Furthermore, some of the motorcycle dynamometers of the prior art are hazardous to the operator, cycle and bystanders.

SUMMARY OF THE PRESENT INVENTION

In the present application, a new and improved motorcycle dynamometer is disclosed with features not present in the prior art. The disadvantages present in much of the prior art are eliminated.

The dynamometer of the present invention comprises a support assembly or frame on which a motorcycle may be supported; a power absorption roller mounted on the support frame for engagement with at least one wheel of the motorcycle and including a pump for producing a fluid pressure in response to the torque produced by the wheel; a fluid reservoir connected to the inlet of the pump by a first conduit; and to the outlet of the pump by a second conduit; and pressure indicator means connected to the outlet side of the pump for indicating the discharge pressure thereof. A unique speed measuring and indicating apparatus is also provided whereby the speed and fluid pressure, indicated by the pressure indicator, may be correlated with the performance of the motorcycle. A blower for simulating road wind may also be provided and in the present invention is uniquely connected to the discharge of the power absorption pump for driving the blower. In addition to simulating road wind, the blower serves to absorb much of the energy of the high-pressure fluid, eliminating the need for cooling of the fluid by any means other than normal convective cooling of the air surrounding the machine.

The power absorption unit uniquely utilizes a pump of the rotary positive displacement type and along with the accurately measuring speed indicator provides power measuring accuracy not heretofore available in portable motorcycle dynamometers. The simulated road wind provided by the blower also contributes to a much more accurate measurement of power characteristics since the entire power system is operating under very realistic temperature conditions.

The motorcycle dynamometer of the present invention is totally portable and completely self-contained. No auxiliary power sources or other auxiliary apparatus is required for its operation. Thus, the dynamometer can be used at almost any location.

In addition to being portable, self-contained and more accurate, the dynamometer of the present invention eliminates the hazards present in dynamometers of the prior art. The unique wheel engaging rollers and safety tie-down reduce the possibility of the motorcycle leaving the support frame. In addition, other safety features such as a ramp which doubles as a safety shield for the power wheel is provided. Many other objects and advantages of the invention will be apparent from a reading of the specification which follows in conjunction with the accompanying drawings.

DESCRIPTION OF A PREFERRED EMBODIMENT

Figure 1:
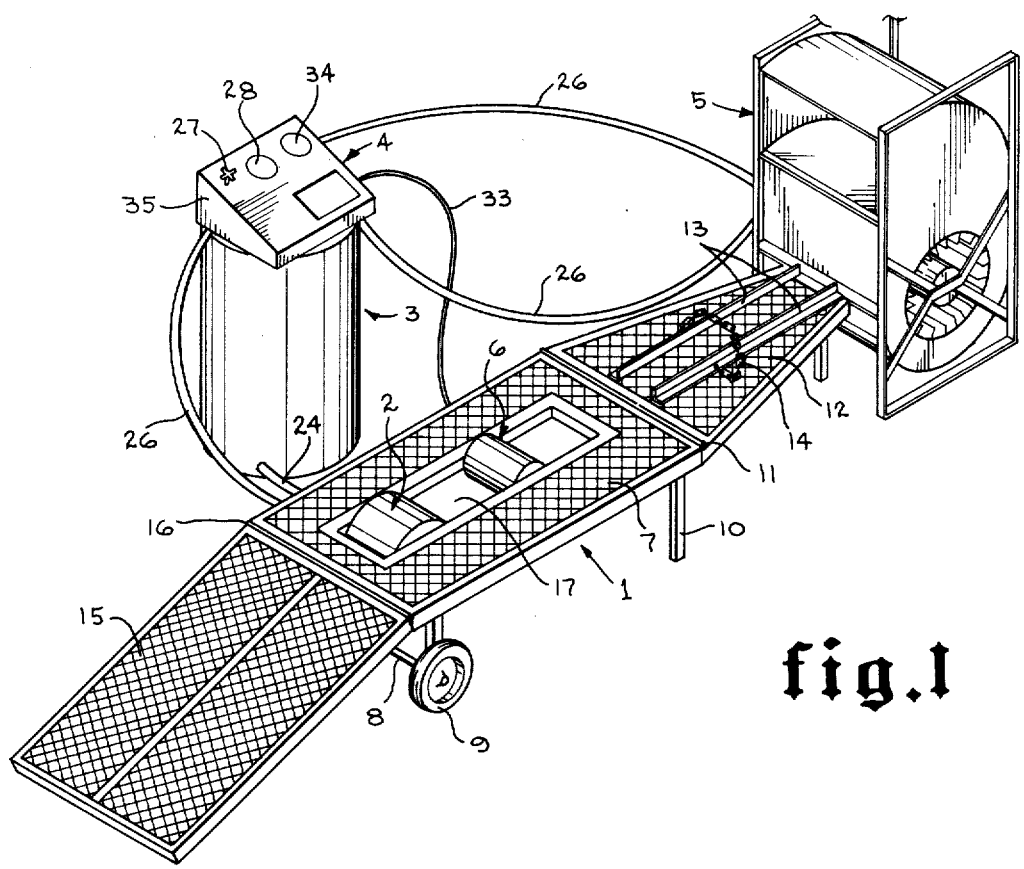
FIG. 1 is a perspective representation of a dynamometer, according to a preferred embodiment of the invention.

Referring first to FIG. 1, the dynamometer of the present invention may generally comprise a support assembly or frame 1, power absorption apparatus 2, fluid reservoir 3, indicating apparatus 4, blower apparatus 5, and speed indicating apparatus 6. These components are uniquely arranged in a completely portable and self-contained unit.

Figure 2:
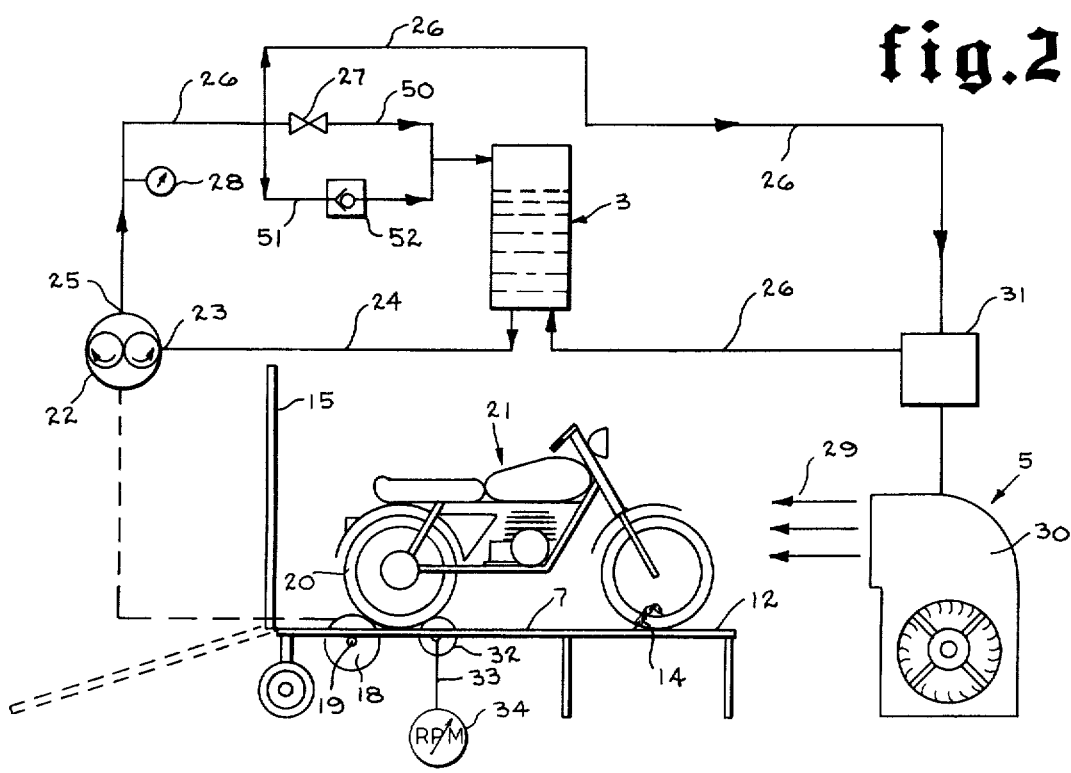
FIG. 2 is a schematic representation of the dynamometer of FIG. 1 illustrating a motorcycle placed thereon for measuring the power characteristics thereof.

The support assembly 1 includes a platform 7 on which the motorcycle, to be tested, will be supported, e.g., as in FIG. 2. The platform may be provided with an axle 8 and rear wheels 9 by which the entire unit may be moved from place to place. Front support legs 10 may also be provided with platform 7. Hingedly attached at 11 to the forward part of platform 7 is a front support or apron 12 on which the front wheel of the motorcycle would be supported. Rails 13, between which the front wheel would be positioned, and a chain 14 may be provided to assure that the motorcycle does not leave the support assembly 1.

A ramp 15 is hingedly connected at 16 to the rear of the platform 7 and serves as a means by which the motorcycle may be moved from the ground to its position on the support assembly 1. The ramp 15 may be elevated to a substantially upright position, as in FIG. 2, to provide a safety shield during testing of the motorcycle. Both ramp 15 and apron 12 may be pivoted to substantially upright positions for movement of the entire unit from one place to another. During such periods, the blower 5 would be placed on the platform 7 for movement therewith. The unit is light enough that it can be carried in a pickup truck or on most motorcycle trailers. A hand truck may be provided for moving the unit.

The platform 7 may be provided with a slot or well 17 in which rollers of the power absorption apparatus 2 and speed indicating apparatus 6 may be mounted. The roller 18 of the power absorption unit is preferably of the drum type and is mounted on a shaft 19 (see FIG. 2) supported by the platform 7 for frictional engagement with the rear or driving wheel 20 of the motorcycle 21 which is being tested.

As best seen in FIG. 2, the power absorption unit also includes a pump 22 which is directly connected to the shaft 19 for rotation thereby in response to the torque developed by the motorcycle wheel 20. The pump 22 is preferably of the rotary positive displacement type sometimes referred to as a "gear pump." The inlet of the pump 22 is connected by a first conduit 24 to an oil, or other hydraulic fluid, reservoir 3. The outlet 25 of the pump 22 is connected, eventually, by a second conduit 26 to the reservoir. Thus the pump 22 receives fluid from the reservoir 3 and discharges it at a substantially higher pressure at 25 for return to the reservoir 3 through conduit 26. The pressure produced by the pump 22 is dependent on the torque developed by the motorcycle wheel 20.

A throttling valve 27 may be connected in the conduit 50 by which loading of the power absorption apparatus can be controlled by controlling an appropriate amount of fluid directed back to the reservoir 3. A pressure gauge 28 is connected to the conduit 26 to measure the discharge pressure of pump 22. A conduit 51 is connected to the downstream of the pump but upstream of the control throttle valve. This line 51 returns the fluid to the reservoir 3 through the relief valve 52. If the pressure exceeds a safe level at the pump outlet, the relief valve automatically opens to dump the fluid directly back to the reservoir 3.

The blower apparatus 5 is for the purpose of producing an air stream 29 (see FIG. 2) which simulates the road air or wind which would be encountered by the motorcycle 21 under normal road operating conditions. Such an air stream 29 will effectively cool the power system of motorcycle 21 in a manner similar to road wind. Although many types of blowers may be used, a squirrel cage type 30 has been found to be especially desirable. The blower 30 is preferably driven by a fluid motor or drive unit 31, the power fluid of which is supplied through conduit 26 from the discharge of pump 22. After the fluid circulates through the fluid drive 31, it returns to reservoir 3 through the last portion of conduit 26. It should be noted that part of the energy present in the fluid on the discharge side of pump 22 is thus utilized to drive the blower 30. This is a particularly unique feature of the present invention since those dynamometers of the prior art which are provided with fans or blowers require auxiliary power sources such as an electric motor.

In addition to simulating road wind and utilizing much of the energy present within the system to do so, the blower apparatus 5 serves an additional function. By absorbing the energy within the fluid and consequently reducing its pressure, it is not necessary to throttle all of the fluid before returning to the reservoir 3. In systems which require throttling all the fluid before returning it to a reservoir, excessive heat is generated which must be dissipated by some type of a cooling device. This requires a heat exchanger connected to a source of water or other cooling medium. This additional equipment and auxiliary apparatus is thus eliminated with the dynamometer of the present invention. The heat that is generated by the throttling part of the oil is rejected from the surfaces of the reservoir and other parts without installing special equipment for this purpose.

The speed indicating apparatus 6 of the present invention includes a roller 32 which is mounted in the platform well 17 for engagement with the wheel 20 of motorcycle 21. The distance between rollers 18 and 32 (which may be adjustable) is designed to receive the wheel 20 so that the angle between radial lines projecting from the axis of wheel 20 to the axes of rollers 18 and 32 is preferably between 60° and 120°. In fact, 90° has been found to give particularly good traction while avoiding excessive tire wear.

The speed measuring apparatus also includes a speedometer 34, the cable 33 of which is directly connected to the roller 32. Since, unlike motorcycle dynamometers of the prior art, speed is measured by an independent roller 32, the measurement thereof is not affected by the slippage which is inherent in the torque-transmitting roller 18. It will be noted that the speedometer 34 may be mounted, along with pressure gauge 28 and valve 27, on an instrument panel 35.

Figure 3:
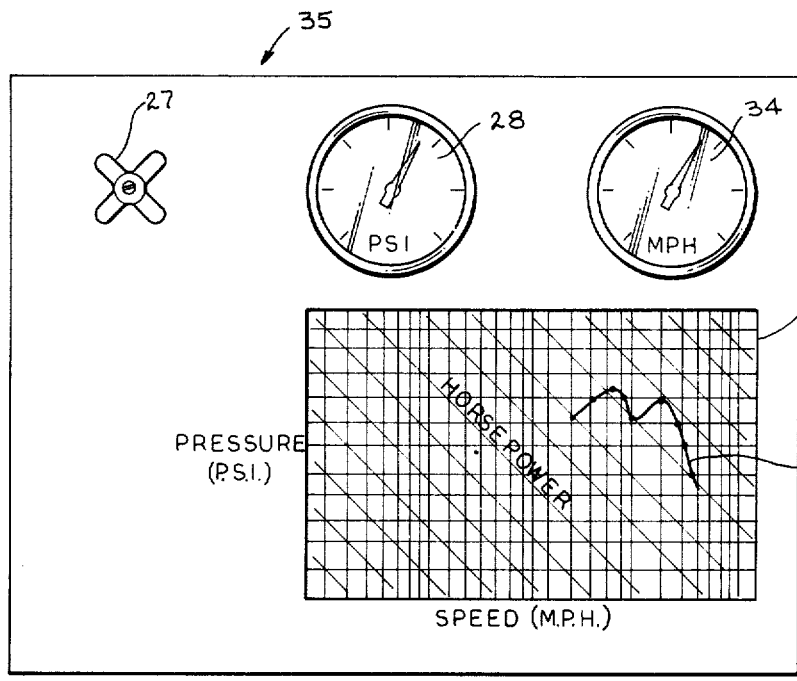
FIG. 3 is a plan view of an instrument panel which may be utilized with the present invention.

As best seen in FIG. 3, the instrument panel 35 may also be provided with a chart 36 having horizontal lines representing pressure, vertical lines representing speed and inclined lines representing horsepower for a particular pressure and speed. The load on the motorcycle being tested may be controlled by adjustment of the control or throttling valve 27 so that several test points may be plotted on the chart 36 for the pressure and speed developed for each setting of the control valve 27. These test points may be plotted to produce a curve 37 from which the horsepower developed at any speed may be determined.

Figure 4:
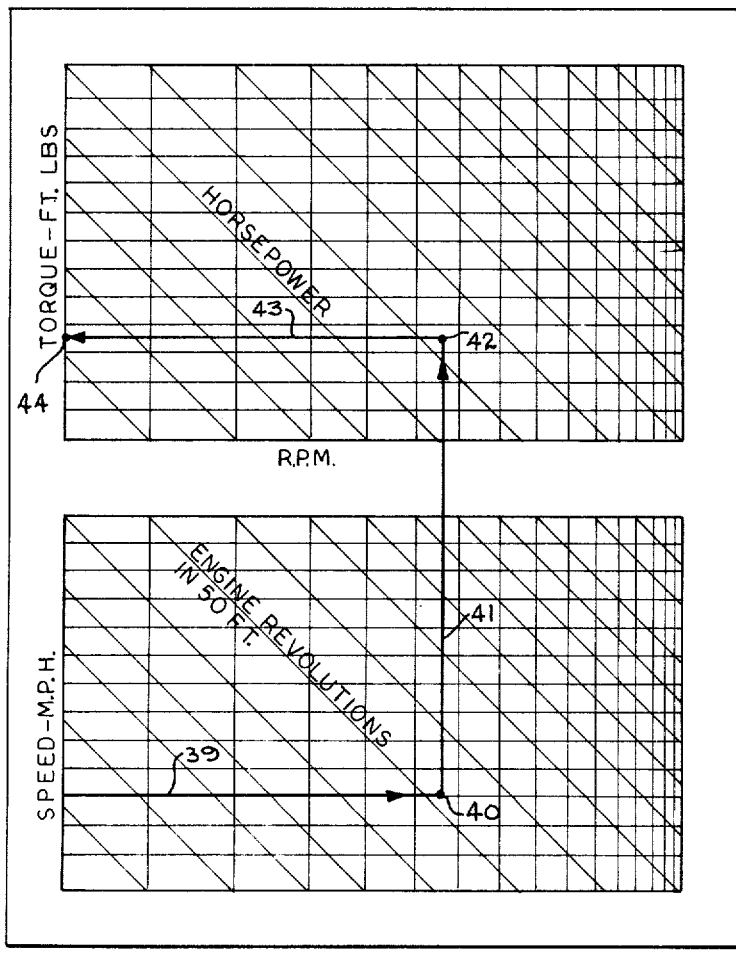
FIG. 4 represents an evaluation chart which may be used to convert horsepower and speed data into rpm and torque (footpounds) for a particular motorcycle engine.

If a more complete analysis of engine operation is desired, a "speed-torque" chart 38, such as shown in FIG. 4, may be utilized. The lower portion of the chart 38 is a plot of speed versus engine revolutions in some distance of movement, e.g., 50 feet. The upper portion of the chart is plotted for revolutions per minute of the engine, horsepower and torque thereof. To determine the engine revolutions in 50 feet, all that is required is the gear ratio of the motorcycle and the wheel diameter. In the alternative, the number of engine revolutions may be counted as the motorcycle is rolled 50 feet.

STATEMENT OF OPERATION

In operation, a motorcycle 21 may be rolled up the ramp 15 and placed with the rear wheel 20 supported between and engaging the rollers 18 and 32. The forward roller 32 shall have been previously adjusted to provide between 60° and 120° between radial lines from the center of wheel 20 through the axes of rollers 18 and 32. In fact, 90° has been found to give particularly good traction while avoiding excessive tire loading. The front wheel rests on apron 12 and is restrained by safety chain 14. The rear ramp may be elevated by the operator who sits on the motorcycle in conventional riding position.

The motorcycle power is then applied through the roller 18. The speed of the motorcycle engine is controlled by the throttle valve 27 and measured by the front roller 32. The torque which is produced by the motorcycle is proportional to the pressure generated in the pump. Minor torque is produced by friction drag in the pump and is not reflected in the pressure output, but this is normally less than 1% and is negligible error. Thus, knowing the displacement of the hydraulic pump, a relatively precise torque value can be determined by measuring the output pressure.

Since the speed is measured accurately by the free running roller 32, the horsepower being applied to the test stand by the rear wheel of the motorcycle can be accurately calculated. The chart shown in FIG. 3 is an example. For each pressure and speed there is a unique horsepower which can be cross-plotted as shown in this figure. The shape of the curve is proportional to the torque speed curve for the motorcycle and the horsepower level at each speed can be read. This is normally all that is required in motorcycle evaluation. However, if actual engine speed and torque is desired, a second chart shown in FIG. 4 can be used.

Knowing the tire size and gear ratio, or the engine revolutions in a given distance (50 feet or so) the speed can be related to the engine RPM as shown in FIG. 4. Then, knowing the horsepower output (from FIG. 3), the engine torque can be determined as illustrated. To utilize the chart 38 for any speed in miles per hour, a line 39 may be projected to a point 40 representing the engine revolutions in 50 feet. From this point, a line 41 is projected vertically to a point 42 representing the horsepower read from horsepower curve 37 (FIG. 3) which was previously plotted from the test. A line 43 is then projected horizontally for a reading of engine torque in footpounds at point 44. It will also be noted that the engine RPM can be read where the vertical line 41 crosses into the upper portion of the chart 38. Thus, the acutal engine performance can be evaluated.

As the pressure is being generated by the motorcycle torque, most of the pressurized fluid goes through the hydraulic motor to operate the blower. As the motorcycle produces more torque, more pressure is produced which forces more fluid through the blower drive and makes the blower produce more air. Thus, as the motorcycle works harder, the blower blows harder simulating realistic road air conditions. This is important since the temperature of the entire system — carburetor, engine, exhaust, transmission, tires, etc., — all affect power output. Meanwhile, the pressure (and the load on the motorcycle engine) is controlled by valve 27 to produce the desired test speed by short circuiting or bypassing a portion of the oil directly back to the reservoir. The displacement of the pump and the fluid drive are carefully selected to give the best compromise between cooling and controllability.

The relief valve 52 is inactive unless excessive torque is applied, overpressuring the unit. The relief valve is set to flow adequately in the event of overpressure to protect the gauge and other pressure sensitive elements in the system. While a portion of the oil is throttled back to the reservoir causing heating in the oil, the resulting heat is not excessive to the point that special cooling elements are required. Steady operations at 50 to 75 horsepower will cause temperatures no greater than 160°F in the installation described herein when operated properly.

Proper operation requires selection of the proper gear for the motorcycle. Typically, the test should be made in a gear that will produce enough pressure to operate the blower vigorously. Low gear produces the highest pressure (high torque) and high gear produces a low pressure (low torque). Thus, normally, a middle gear gives best results, the lower the better until the relief valve is actuated, making it impossible to further control the load on the motorcycle. Operation at a fairly high pressure forces the majority of the oil through the blower drive, resulting in minimum heating. The valve 27 is operated nearly closed, resulting in minimum throttling of the fluid thus minimum heat generation in the oil.

Normally, during operation, the data is recorded (pressure and speed) for plotting on the graph and evaluation at a later time. As best seen in FIG. 3, the instrument panel 35 may also be provided with a chart 36 having horizontal lines representing pressure, vertical lines representing speed and inclined lines representing horsepower for a particular pressure and speed.

CONCLUSION

From the foregoing description and statement of operation, it can be seen that the motorcycle dynamometer of the present invention offers many features and advantages not provided in the prior art. The dynamometer is put together in a highly portable, completely self-contained unit, requiring no auxiliary power sources or other auxiliary apparatus.

A unique blower arrangement is provided for simulating the road wind and cooling the motorcycle power train which also serves another function. The blower is driven by a fluid motor powered by fluid routed from the power absorption apparatus so that much of the energy of the high pressure fluid produced therein can be utilized. This also prevents having to throttle all the fluid, which would result in excessive heating up the oil reservoir. Thus, energy is conserved and the necessity of an oil cooler is eliminated.

Speed is taken from an independent roller not affected by the slippage inherent in torque transmission apparatus, resulting in accuracy of speed measurement. Measurement of torque is also accurate due to the design of the power absorption unit.

Although the dynamometer of the present invention has been primarily designed for testing motorcycles, it is not so limited. It could be adapted for testing the performance of any wheeled vehicle. Furthermore, many variations of the invention can be made by those skilled in the art without departing from the spirit of the invention. It is therefore intended that the scope of the invention be limited only by the claims which follow.

We claim:

1. Dynamometer apparatus for measuring the performance of a wheeled vehicle comprising:
   support means on which said vehicle may be supported;
   power absorption means mounted on said support means and including first roller means for frictional engagement with at least one wheel of said vehicle;
   pressure means included with said power absorption means for producing a fluid pressure in response and proportional to the torque produced at said vehicle wheel;
   speed means mounted on said support means and including second roller means for engagement with said vehicle wheel, independently of said first roller means for indicating the surface speed thereof; and
   indicator means connected to said pressure means and said speed means for measuring said fluid pressure and said surface speed and including chart means on which horsepower curves are plotted for various speeds and pressure so that the horsepower of said motorcycle can be determined by entering the pressure and speed measured by said indicator means.

2. Dynamometer apparatus as set forth in claim 1 in which said pressure means comprises pump means connected to and driven by said first roller means and having its inlet in fluid communication with a fluid reservoir and said indicator means includes a pressure indicator connected to the outlet of said pump means for indicating the discharge pressure thereof.

3. Dynamometer apparatus as set forth in claim 2 in which a return conduit is connected to said pump means outlet and said reservoir for returning fluid from said pump means to said reservoir, control means being connected in said return conduit to control the discharge of said pump means.

4. Dynamometer apparatus as set forth in claim 3 comprising blower means positioned to direct an air stream against said vehicle, said blower means being driven by fluid drive means to which fluid is supplied from said return conduit.

5. Dynamometer apparatus as set forth in claim 2 in which said first roller means is engageable by said vehicle wheel rearwardly of the axis of said wheel for driving said pump in response to rotation of said first roller means.

6. Dynamometer apparatus as set forth in claim 5 in which said second roller means is engageable by said vehicle wheel forwardly of said axis and in which said indicator means comprises a speedometer connected to said second roller means for indicating said surface speed of said vehicle wheel.

7. Dynamometer apparatus as set forth in claim 1 in which said support means comprises an elevated platform on which said vehicle is to be supported and an inclined ramp by which said vehicle may be transported to said platform, said inclined ramp being hingedly attached to said platform whereby said ramp may be pivoted to a substantially upright position, after placement of said vehicle on said platform, to provide a safety shield therefor, the forward portion of said platform also being hingedly attached to the rearward portion of said platform so that both said forward platform portion and said ramp may be pivoted to a substantially upright position for storage and transport.

8. Dynamometer apparatus for measuring the performance of a wheeled vehicle comprising:
   support means on which said vehicle may be supported;
   power absorption means mounted on said support means for engagement with at least one wheel of said vehicle;
   pump means included with said power absorption means for producing a fluid pressure in response and proportional to the torque produced by said vehicle wheel;
   fluid reservoir means;
   first conduit means providing fluid communication between said reservoir means and the inlet of said pump means;
   second conduit means providing fluid communication between said reservoir means and the outlet of said pump means;
   pressure indicator means connected to the outlet side of said pump means for indicating the discharge pressure thereof; and
   blower means for directing an air stream across said vehicle on said support means, said blower means being driven by fluid power means connected to said second conduit for operation by fluid from the outlet of said pump means.

9. Dynamometer apparatus as set forth in claim 8 in which said pump means comprises a pump of the rotary positive displacement type.

10. Dynamometer apparatus as set forth in claim 8 comprising control valve means connected to said first conduit means for controlling the discharge pressure of said pump means and loading said power absorption means.

11. Dynamometer apparatus as set forth in claim 8 comprising speed indicator means engageable with said vehicle wheel for indicating the surface speed thereof.

12. Dynamometer apparatus as set forth in claim 11 in which said power absorption means comprises first roller means, engageable by said vehicle wheel and connected to said pump means for driving thereof, and in which said speed indicator means comprises second roller means engageable by said vehicle wheel independently of said first roller means and connected to a speedometer for indicating said surface speed.

13. Dynamometer apparatus as set forth in claim 12 in which said first and second roller means are mounted on said support means to receive and support said vehicle wheel therebetween, said first and second roller means being rearwardly and forwardly, respectively, of the axis of said vehicle wheel.

14. Dynamometer apparatus as set forth in claim 13 in which the radial lines between the axis of said vehicle and the axis of each of said roller means form an angle of between 60° and 120°.

15. A method of determining horsepower developed by a motorcycle comprising the steps of:
  placing the driven wheel of the motorcycle between a pair of independently mounted roller members for engagement therewith, one of said roller members being attached to a positive displacement pump;
  applying the power of the motorcycle to said one roller to operate said pump;
  sensing the discharge pressure of said pump;
  sensing the speed of said other roller member;
  correlating said pump discharge pressure with said speed of said other roller member to calculate the horsepower developed by said motorcycle at said speed.

16. A method of determining horsepower as set forth in claim 15 in which the discharge of said pump is throttled to load said motorcycle for measuring said horsepower under different conditions.

17. A method of determining horsepower as set forth in claim 15 in which air is blown across said motorcycle at a rate substantially proportional to the torque developed thereby to cool said motorcycle and simulate road wind.

18. A method of determining horsepower as set forth in claim 17 in which said air is supplied by a blower driven by the discharge of said pump.

* * * * *